United States Patent [19]
Rey et al.

[11] 3,841,864
[45] Oct. 15, 1974

[54] METHOD FOR PRODUCING NICKEL BY SEGREGATION OF NICKEL OXIDE ORES

[75] Inventors: Maurice Rey; Victor Formanek, both of Paris, France

[73] Assignees: Le Nickel, Societe Miniere et Metallurgique de Penarroya, both of Paris, France

[22] Filed: Oct. 25, 1972

[21] Appl. No.: 300,491

[30] Foreign Application Priority Data
Nov. 3, 1971  France .............................. 71.39335

[52] U.S. Cl. ..................... 75/101 R, 75/82, 75/111, 75/113, 75/114, 75/119, 75/108, 423/140, 423/147, 423/150, 423/138
[51] Int. Cl. ...................... C22b 23/04, C22b 23/00
[58] Field of Search ....... 75/82, 111, 113, 114, 119, 75/108, 101 R; 423/138, 140, 147, 150

[56] References Cited
UNITED STATES PATENTS
3,453,101  7/1969  Takahashi et al. ................. 75/111 X
3,503,735  3/1970  Beggs et al. ........................ 75/82 X FOREIGN PATENTS OR APPLICATIONS
2,109,118  5/1972  France ................................. 75/111
2,063,367  7/1971  France ................................. 75/111
45-7414    3/1970  Japan .................................. 75/82
41-7932    4/1966  Japan .................................. 75/82

Primary Examiner—Herbert T. Carter
Attorney, Agent, or Firm—Fleit, Gipple & Jacobson

[57] ABSTRACT

In a method for producing nickel by segregation of a nickel oxide ore by means of a carbonaceous reducing agent and calcium chloride, the improvement including leaching the segregated ore with water, treating the resulting solution to precipitate the nickel values contained therein, washing the gases produced during the segregation using the solution from which the nickel values have been precipitated, neutralizing the solution used for washing with a basic calcium compound, and evaporating the resulting solution, the calcium chloride thus obtained being used for segregating fresh amounts of the nickel oxide ore.

7 Claims, 1 Drawing Figure

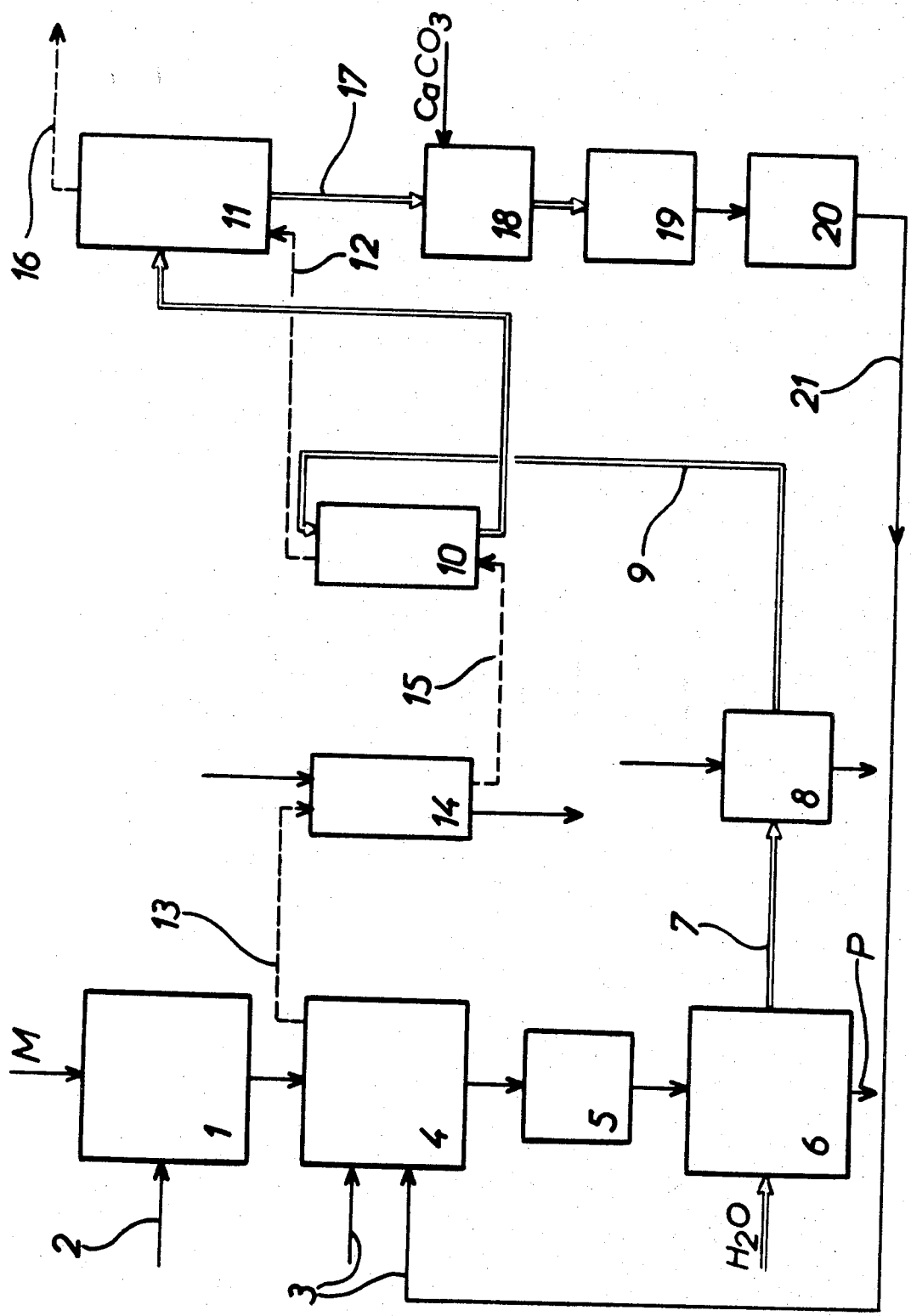

METHOD FOR PRODUCING NICKEL BY SEGREGATION OF NICKEL OXIDE ORES

The present invention relates to an improved treatment of oxide nickel ores by the segregation method.

It is known that the segregation method consists in adding to the ore a carbonaceous reducing agent like carbon, and a chlorinating agent which can be an alkaline metal chloride or alkaline-earth metal chloride or a mixture of such chlorides, or even gaseous hydrogen chloride. This mixture is then heated at about 1,000°C and the nickel, which was disseminated in the gangue, forms a deposit, or "segregates," on the carbon particles, from which it can subsequently be easily separated, for example by flotation or by magnetic separation, with extraction yields up to 90 percent.

In fact, during this treatment the chlorinating agent is decomposed by the present water vapor, giving gaseous hydrogen chloride which is the actual chlorinating and volatilizing agent, and which is necessary for transfering the metal on the carbon particles.

A great amount of chlorinating agent is generally used. For example in case where calcium chloride is used, it is necessary to add to the ore 4 to 6 weight percent of anhydrous chloride. For this reason, it is desirable to recover the greatest possible of chlorine after the reactions and to regenerate the chlorinating agent in order to recycle it at the heat of the treatment, so as to limit as much as possible the introduction of fresh chlorinating agent. This chlorine recovery, besides its direct economical interest, provides for a security margin in the consumption of chlorinating agent, which is very favorable to the nickel recovery.

During the segregation reactions, which take place at temperatures ranging from about 950° to 1,050°C, a fraction of the chlorine contained in the chlorinating agent escapes with the furnace gases in the form of gaseous hydrogen chloride and of gaseous ferrous chloride. This is however not the only cause of the chlorine loss: a part of the chlorinating agent used is not decomposed and remains in the segregated ore.

A method for recovering the chlorine contained in the gases has been described by the Applicants in their French Pat. No. 2,063,367.

This process, however, although it constitutes a noteworthy improvement with regard to the prior art, offers some disadvantages, and for this reason, the present invention has for an object the complete recovery of the chlorine occuring in the segregation of oxidized nickel ores.

A further object of the invention is to combine in a single process the treatment of the gases and the treatment of the segregated ore.

A further object of the invention is the recovery of the small quantity of nickel which is not reduced to the metallic state during the segregation and remains in the form of chloride.

According to the invention, these objects, and other ones which will appear further below, are reached by a process of the kind described hereinabove, wherein the chlorinating agent is calcium chloride and which comprises the different successive following steps:

a. leaching of the segregated ore with water;
b. treatment of the solution resulting from step (a) for precipitating the nickel values contained therein;
c. washing of the gases produced during the segregation by means of the solution resulting from step (b);
d. neutralization of the solution resulting from step (c) by means of a basic calcium compound;
e. evaporation of the solution resulting from step (d), the calcium chloride thus obtained being used for segregating fresh amounts of said nickel oxide ore.

The basic calcium compound used for performing the neutralization step (d) is preferably lime or calcium carbonate.

Preferably, the gases produced during said segregation treatment are submitted to an oxidizing treatment before being submitted to said washing.

The gases produced during said segregation treatment are advantageously submitted to a counter-current cooling by means of the solution resulting from step (b), before being submitted to washing.

It is clear that this cooling can be concomitant with the washing treatment or can be performed separately, for example in an heat-exchanger, before the washing itself.

This cooling causes the partial evaporation of the solution resulting from step (b), and owing to this evaporation more water can be used for the leaching of the ore, which is hence more efficient.

The description which follows and which presents no limitative character is only intended to let readily understand how the present invention can be carried out. It must be read in view of the appended drawing which is a flow-sheet schematically representing the main steps of the process according to the invention.

On this drawing, the course of the solid phases has been represented by full lines, the course of the liquids by double full lines and the course of the gases by dotted lines.

As shown on the drawing, the initial ore M is first heated to a temperature of about 1,000°C in a furnace 1 supplied at 2 with a fuel which is advantageously fuel-oil as described by the Applicants in their French Pat. No. 2,109,118. The ore so preheated is then admixed at 3 with a carbonaceous reducing agent like coke and a chlorinating agent such as calcium chloride $CaCl_2$. The ratio of these additions is described, among others, in the aforementioned French Pat. No. 2,109,118. The mixture is submitted at 4 to the segregation treatment, which is performed at a temperature of about 1,000°C. This operation being now classical, it will not be described in greater detail. The segregated ore is cooled at 5 and leached with water at 6, and the solid product P thus obtained is then treated, for example by flotation or magnetic separation in order to recover the nickel contained therein.

The solution 7 resulting from the water leaching 6 of the segregated ore contains essentially nickel chloride and calcium chloride. This solution is separated from the solid product P by decantation and/or by filtration and maintained at a slightly acidic pH in order to avoid hydrolysis of the nickel chloride contained therein.

The nickel is then separated at 8 from the solution 7 by adding lime or sodium sulfide to this solution. In the first case the metal is obtained in the form of nickel hydroxyde $Ni(OH)_2$, and in the second case, in the form of nickel sulfide NiS. A solution 9 containing essentially calcium chloride is then recovered.

This solution 9 runs through a gas cooling plant 10, then it is introduced upstream in a washing tower 11 where it is contacted with the gases 12, the production of which will now be explained.

The gases 13 resulting from the segregation treatment 4 are at a temperature of about 900°C and contain essentially carbon dioxide, carbon monoxide, hydrogen chloride and gaseous ferrous chloride. They are oxidized at 14 by being contacted with air and water vapor. This operation reduces their temperature to about 800°C and converts carbon monoxide into carbon dioxide and ferrous chloride into iron oxide $Fe_2O_3$, as described in the above-mentioned French Pat. No. 2,063,367. The gaseous mixture 15 obtained contains substantially only carbon dioxide and hydrogen chloride. This mixture is introduced into the above-mentioned cooling plant 10, counter-currently with respect to the solution 9 of calcium chloride, resulting in the mixture 12, the temperature of which is about 200°C. This mixture 12 is washed at 11 by the solution of calcium chloride.

The obtained products are, on the one hand, residual gases 16 containing a large proportion of carbon dioxide, and, on the other hand, a solution 17 containing almost exclusively calcium chloride and hydrochloric acid.

The solution 17 is neutralized at 18 by the amount of limestone $CaCO_3$ which is necessary for leaving only calcium chloride $CaCl_2$ in the solution. After evaporation 19 and drying 20, this calcium chloride 21 is obtained in anhydrous form and can be used again for the segregation treatment 4.

It will be readily understood that this method allows the complete recovery, in the form of anhydrous calcium chloride, of the chlorine introduced at 3 in the form of the chlorinating agent which is necessary for the segregation treatment 4.

On the other hand, those skilled in the art will easily understand that the described method allows the recovery at 8 of the nickel which was not reduced to the metallic state and which remained in the form of its chloride. Whereas only very small amounts of nickel chloride appear in the gases 13, greater amounts of this product,—up to 1 to 3 percent of the total amount of nickel—, can be present in the ore which has been submitted to the segregation treatment 4. This fact results in substantially lower costs when this method is carried out.

The costs are also lowered by the evaporation at 10 of the solution 9, this evaporation taking place when the solution is contacted with the hot gases 15. Owing to this evaporation, more water can be used for the leaching of the ore at 6 and this leaching is more efficient.

As a matter of course, the cooling 10 of the gases 15 and their washing 11 by the calcium chloride solution 9 can be carried out in a single step.

What we claim is:

1. In a method for producing nickel by segregation of a nickel oxide ore by means of a carbonaceous reducing agent and of calcium chloride, the improvement which comprises the different successive following steps:
   a. leaching of the segregated ore with water;
   b. treatment of the solution resulting from step (a) for precipitating the nickel values contained therein;
   c. washing of the gases produced during the segregation by means of the solution resulting from step (b);
   d. neutralization of the solution resulting from step (c) by means of a basic calcium compound;
   e. evaporation of the solution resulting from step (d), the calcium chloride thus obtained being used for segregating fresh amounts of said nickel oxide ore.

2. A method according to claim 1, wherein the gases produced during the segregation treatment are submitted to an oxidizing treatment before washing step (c).

3. A method according to claim 2, wherein said oxidizing treatment is performed by means of air and water vapor.

4. A method according to claim 1, wherein the basic calcium compound is selected from the group consisting of lime and calcium carbonate.

5. A method according to claim 1, wherein the solution resulting from step (b) is partially evaporated by being contacted with the gases produced during the segregation treatment, said gases flowing counter-currently with respect to said solution.

6. A method according to claim 1 wherein step (b) of precipitation of the nickel values is performed by adding lime to said solution.

7. A method according to claim 1, wherein step (b) of precipitation of the nickel values is performed by adding sodium sulfide to said solution.

* * * * *